(12) United States Patent
Robertson et al.

(10) Patent No.: US 8,626,443 B2
(45) Date of Patent: Jan. 7, 2014

(54) METHOD FOR CREATING A MAP RELATING TO LOCATION-RELATED DATA ON THE PROBABILITY OF FUTURE MOVEMENT OF A PERSON

(75) Inventors: Patrick Robertson, Ammerland (DE); Michael Angermann, Graefelfing (DE); Bernhard Krach, Hilpoltstein (DE)

(73) Assignee: Deutsches Zentrum für Luft—und Raumfahrt e.V., Cologne (DE)

( * ) Notice: Subject to any disclaimer, the term of this patent is extended or adjusted under 35 U.S.C. 154(b) by 0 days.

(21) Appl. No.: 13/496,889

(22) PCT Filed: Sep. 20, 2010

(86) PCT No.: PCT/EP2010/063778
§ 371 (c)(1),
(2), (4) Date: Jun. 4, 2012

(87) PCT Pub. No.: WO2011/033100
PCT Pub. Date: Mar. 24, 2011

(65) Prior Publication Data
US 2012/0232795 A1  Sep. 13, 2012

(30) Foreign Application Priority Data
Sep. 18, 2009 (DE) .......................... 10 2009 041 837

(51) Int. Cl.
G01C 21/00 (2006.01)
G08G 1/123 (2006.01)

(52) U.S. Cl.
USPC ........................................................ 701/532

(58) Field of Classification Search
USPC ................................................. 701/120, 532
See application file for complete search history.

(56) References Cited

U.S. PATENT DOCUMENTS 5,543,802 A * 8/1996 Villevieille et al. ...... 342/357.51
6,323,807 B1 * 11/2001 Golding et al. ............... 342/419

(Continued)

OTHER PUBLICATIONS

Krach B et al: "Cascaded estimation architecture for integration of foot-mounted inertial sensors", 2008.

(Continued)

*Primary Examiner* — Mary Cheung
*Assistant Examiner* — Frederick Brushaber
(74) *Attorney, Agent, or Firm* — Renner, Otto, Boisselle & Sklar, LLP

(57) ABSTRACT

The invention relates to a method for creating a map relating to location-related data on the likelihood of the future movement of a person in a spatial environment, such as a building, forest, tunnel system or public place, and in particular a shopping center, airport or train station. In the method according to the invention, at least one person is supplied with one or more sensors (e.g. inertial sensors, rotation rate sensors, optical sensors) for odometrical measurement (odometry) (e.g. attached to a shoe), wherein the odometry has errors due to inherent measurement inaccuracies of the sensor(s) (e.g. angle deviations, length deviations). The at least one person moves by foot through the spatial environment. Information regarding the pedestrian step lengths and/or pedestrian step direction and/or orientation of the sensor or the person (called odometry information $Z^u$) is determined from the measurement signals of the sensor(s). Based on said odometry information, a map is created using a Bayesian estimator (e.g. particle filter, Rao-Blackwellized particle filter, Kalman filter, Mone-Cario hypothesis filter or combined forms of such filters), the state-variable space thereof (e.g. hypothetical space of the particle of a particle filter) comprising both the current pedestrian step (pedestrian step length and optionally movement direction change as well) of the person U, odometry errors E (e.g. drift parameters with respect to the determined pedestrian step lengths and/or pedestrian step direction and/or orientation of the sensor or the person) and also the location-related data on the probabilities of the future movement of the person.

20 Claims, 14 Drawing Sheets

(56) References Cited

U.S. PATENT DOCUMENTS

Figure 1:
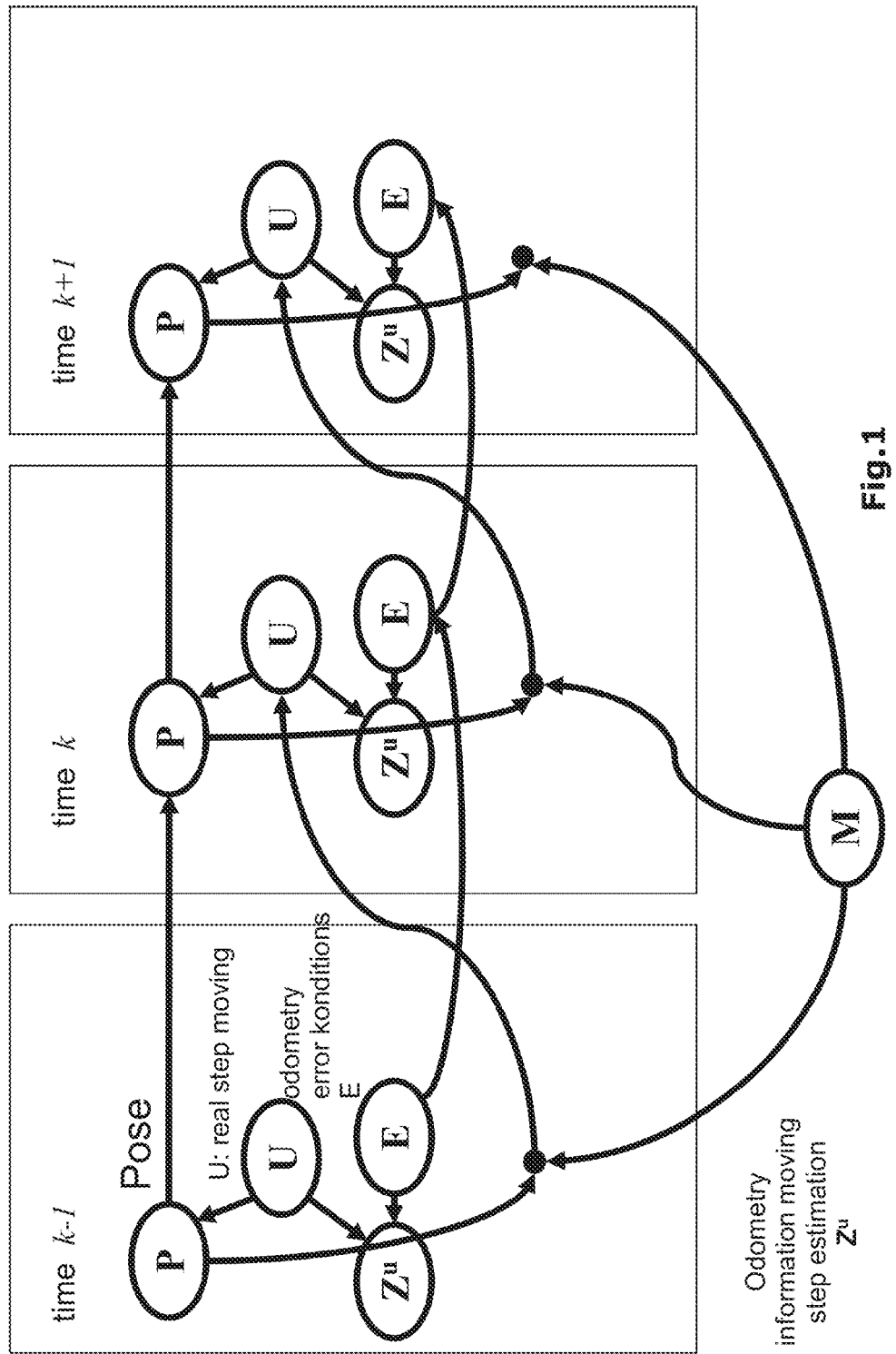

| | | | |
|---|---|---|---|
| 2006/0247847 A1* | 11/2006 | Carter et al. | 701/200 |
| 2010/0125409 A1* | 5/2010 | Prehofer | 701/207 |
| 2010/0305858 A1* | 12/2010 | Richardson | 701/301 |
| 2011/0010033 A1* | 1/2011 | Asahara et al. | 701/26 |
| 2011/0282571 A1* | 11/2011 | Krumm et al. | 701/200 |
| 2012/0035823 A1* | 2/2012 | Carter et al. | 701/70 |
| 2012/0191505 A1* | 7/2012 | Shang et al. | 705/7.31 |
| 2012/0215586 A1* | 8/2012 | Shang et al. | 705/7.31 |
| 2012/0239291 A1* | 9/2012 | Do | 701/451 |

OTHER PUBLICATIONS

Krach B et al: "Integration of foot-mounted inertial sensors into a Bayesian location estimation framework", 2008.

International Search Report for corresponding patent application No. PCT/EP2010/063778 dated Dec. 8, 2010.

* cited by examiner

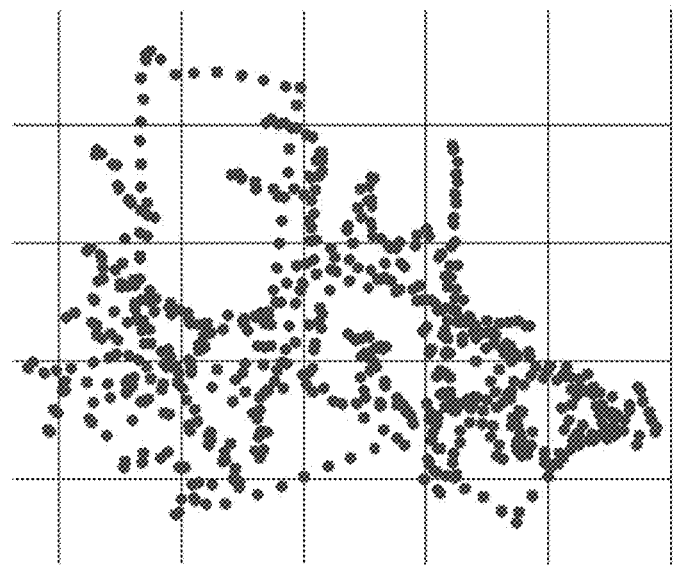
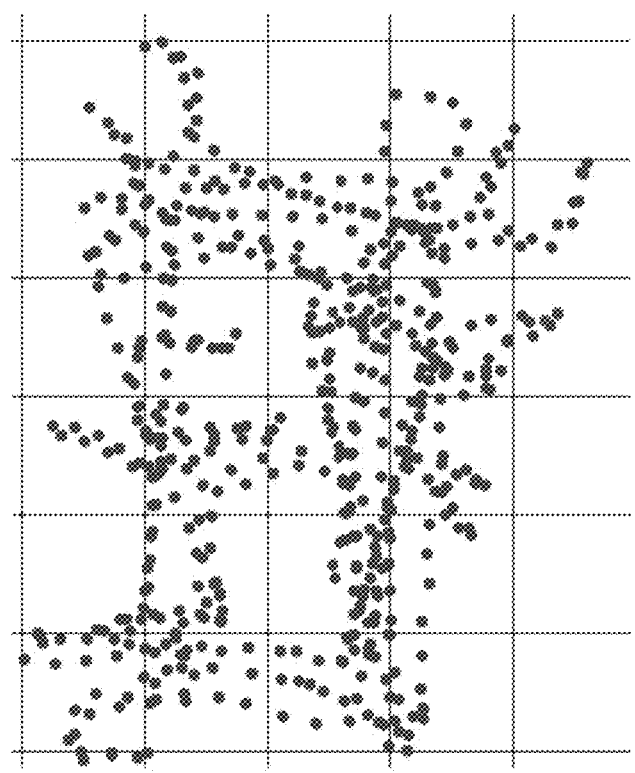
Fig.3

METHOD FOR CREATING A MAP RELATING TO LOCATION-RELATED DATA ON THE PROBABILITY OF FUTURE MOVEMENT OF A PERSON

The invention relates to a method for creating a map relating to location-related data on the probability of the future movement of a person in a spatial environment. The invention particularly relates to a method for the creating of route maps and floor plans inside and outside of buildings by evaluation of sensors carried by persons.

BACKGROUND

The positioning of persons and goods is presently often carried out by use of satellite navigation (e.g. GPS), which, when performed outside of buildings, can yield acceptable accuracies also in case of pedestrians. Within buildings, as well as in areas where the visible range of the sky is considerably blocked from view (e.g. urban canyons, shopping malls, inner courts, railroad stations with partial roofing), there are often massive disturbances caused by shading of the direct signal path from the satellite, or multi-path errors may occur. As a remedy in such situations, use is made in principle of two options—which can also be combined:

1) the use of further radio systems for positioning which allow for reception also within buildings (e.g. Wireless LAN, mobile radio, Ultra Wide Band—UWB), 2) the use of sensor technology adapted to obtain information on the movement of the pedestrian or another body (e.g. inertial sensor technology, odometry in robots, barometric altimeters, passive and active sensors/systems).

A combination of various systems, signals and sensors is referred to as a sensor fusion; it is a suitable method particularly for dynamic bodies (thus, e.g., pedestrians, robots) for connecting the systems to each other in an optimum manner. A further option for improving the accuracy is the use of information on the environment, such as e.g. building floor plans. In "Integration of Foot-Mounted Inertial Sensors into a Bayesian Location Estimation Framework", Krach, Bernhard and Robertson, Patrick (2008), in WPNC 2008, 2008 Mar. 27, Hannover, and "Cascaded Estimation Architecture for Integration of Foot-Mounted Inertial Sensors", Krach, Bernhard and Robertson, Patrick (2008), in PLANS 2008, 2008 May 5-2008 May 8, Monterey, Calif., USA, it is demonstrated that prior knowledge of building floor plans and the mere use of an inertial sensor worn on the shoe (Inertial Measurement Unit for all three spatial axes—IMU) is suited for an unambiguous positioning of a pedestrian in the building. This known method is an important basis for the present application and will be explained in greater detail hereunder:

The pedestrian wears, on his/her shoe, an IMU whose acceleration and rotation-rate signals will be processed in an Extended Kalman Filter (EKF) so as to estimate the position of the shoe—and thus of the person. In order to reduce the problem of the continuously increasing error ("drift"), use is made of so-called Zero Velocity Updates (ZUPTs) so that, in the phases when the foot is resting on the ground, the EKF can be set to zero velocity (so-called pseudo measurement). The resting phases of the foot can be determined in a quite reliable and simple manner by evaluating the acceleration and rotation rates of the IMU since each pedestrian step made by a human involves the occurrence of a characteristic pattern. The use of the EKF and of the ZUPT in this manner was introduced by Foxlin (see Pedestrian Tracking with Shoe-Mounted Inertial Sensors, Eric Foxlin, November/December 2005, published by the IEEE Computer Society 0272-1716/05 2005 IEEE). This method, however, has the disadvantage that the errors—increased by the drift—of the orientation about the vertical axis ("heading") are only poorly observable by the ZUPT, thus causing an increasing inaccuracy primarily of the person's direction. This is also the case—even through to a lesser extent—for the length of path that has been covered. Further, this system, if used alone, will generally only allow for a relative positioning (i.e. in relation to a known starting point). As described above, according to the publications by Krach and Robertson, there could be used an additional hypothesis filter (hereunder also referred to as a particle filter) so as to determine, together with known maps, the position in space in that the "particles" (also referred to as "hypotheses" but hereunder being called "particle") are moved according to the measured pedestrian step estimation of the EFK (which mathematically corresponds to the derivation of a new state of the particle from the proposal function of the particle filter), however, with a respectively different assumed deviation of pedestrian step direction and pedestrian step length. Thus, the hypotheses will "fathom" all possible deviations of the EKF pedestrian step length determination from the real sequence of the person's pedestrian steps. Such hypotheses, normally ranging within the known walls and obstacles, will—as one possibility—be "rewarded", by a high likelihood, in the "update" or "prediction" part of the "particle filter" (PF) algorithm, and will be allowed to be continued in the next time-instant step of the PF algorithm. Those hypotheses which represent "pedestrian steps through walls" will either be directly eliminated or be penalized more less strongly. A disadvantage of this method resides in the requirement for existing knowledge on the walls (building floor plan).

Plans (building floor plans) of existing buildings (or maps of existing paths) are normally established by use of means from the field of surveying technology which are expensive and complex. Often, building floor plans from the construction or planning phase of a building exist as hardcopies; these would either have to be manually scanned (with subsequent post-editing) or be automatically scanned (digitized) and processed to make it possible to detect e.g. walls. This process is expensive and prone to errors. Further, it will not detect various local conditions within/on a building, although these could be useful in the positioning according to the above method because they restrict the possible movement of the hypotheses—e.g. obstacles such as larger pieces of furniture, exhibition objects, large plant arrangements, barriers, temporary or permanent stands, bars, seating arrangements, partition walls etc.

Building floor plans and route networks are of value also outside the application for the mere positioning: in the simulating, adapting and checking of escape routes, in the optimizing and planning of buildings, structures and resources (e.g. optimization of an airport or hospital by use of the knowledge about spatial movement of persons and goods), in interventions by public authorities (e.g. in the fight against terrorism, in the freeing of hostages or in covert investigations), in cases of emergency such as large fires, in mass events (e.g. for analyzing the flows of large masses of people), in routing systems, in logistics (e.g. storage, process optimization), and in electronic assistants such as e.g. electronic navigation systems or museum guides. For a large number of the enumerated applications, such plans are valuable especially if not only the walls are known but also the routes actually used by persons—while such routes can be determined also by pieces of furniture and by other obstacles.

PROBLEMS

There exists a need for a system and a method for detecting building floor plans and/or route networks particularly pertaining to pedestrians. One application of such a system and method is—based on said detection—the positioning and navigation of pedestrians within buildings and outside buildings. The system and method shall not be dependent on measurement instruments and shall be capable to quickly adapt to new situations and to changes in the environment. Further, the system and method shall be capable of imaging particularly such characteristics of the environment which have a strong influence on the real movement of pedestrians.

THE IDEA OF THE INVENTION

The invention proposes a method for creating a map relating to location-related data on the likelihood of the future movement of a person in a spatial environment, wherein, in said method,

- at least one person carries one or more sensors (e.g. inertial sensors, rotation-rate sensors, optical sensors) for odometrical measurement (odometry) (e.g. attached to a shoe), wherein the odometry is error-prone due to inherent measurement inaccuracies of the sensor(s) (e.g. angle deviations, length deviations),
- the at least one person moves by foot through the spatial environment,
- information regarding the pedestrian step lengths and/or pedestrian step direction and/or orientation of the sensor or the person (called odometry information Z) is determined from the measurement signals of the sensor(s),
- based on said odometry information, a map is created using a Bayesian estimator (e.g. particle filter, Rao-Blackwellized particle filter, Kalman filter, Monte-Carlo hypothesis filter or combined forms of such filters), the state-variant space thereof (e.g. hypothetical space of the hypotheses of a particle filter) comprising both the current pedestrian step (pedestrian step length and optionally movement direction change as well) of the person U, odometry errors E (e.g. drift parameters with respect to the determined pedestrian step lengths and/or pedestrian step direction and/or orientation of the sensor or the person) and also the location-related data on the probabilities of the future movement of the person.

A "particle filter" in the sense of the invention is to be understood as a hypothesis filter which is a numerical method by which a plurality of "hypotheses" are dealt with in order to solve a dynamic estimation problem in an approximative manner. In this regard, each hypothesis and respectively each "particle" represents a point in the mostly three-dimensional state-variant space. According to the so-called "importance sampling" principle, a new value is assigned to each hypothesis or each "particle" in the state-variant space in each time-instant step of the numerical method. Subsequently, each hypothesis (particle) will be weighted by a weighting factor and thus be evaluated.

"Importance sampling" in the sense of the invention is to be understood as a numerical representation of the likelihood density function P of a mostly multi-dimensional state variable. A concrete realization of this state variable corresponds to a point in the state-variant space. In "importance sampling", there is extracted, from a likelihood density function P (also referred to as "proposal density"), a quantity of concrete realizations of a proposal random variable. This "proposal density" should have the largest possible similarities to the desired likelihood density function P. The quantity of the thus "drawn" concrete realizations of the proposal random variable represents the approximation to the likelihood density function P. To each concrete realization of the random variable, there is assigned a weighting factor which considers the difference between the "proposal density" and the desired likelihood density function P. If a favorable "proposal density" has been selected, there will be a lesser number of those concrete realizations of the proposal random variable which have relatively low weightings and thus, even though they require expenditure for storage and computation, will offer a lesser contribution to a more precise representation of the likelihood density function P.

Further, it can be provided that said map is created with a delay during the movement of the person through the environment or after storage of the sensor measurement signals or the detected odometry information.

The computations for creating the map can be performed either on an end device which is carried along (e.g. a mobile phone, PDA, portable computer), or on a server.

Advantageously, the created map is used either for positioning or routing of the person or for improved positioning or routing of other persons.

For improvement of the odometry information, use can be made of measurement signals/data of further sensors, e.g. satellite navigation, magnetic compass, WLAN, measurements for positioning, mobile phone position measurements, UWB measurements for positioning, and/or use can made of partial regions of a map of the environment for restricting the state space of the Bayesian estimator which is used according to the invention.

A modification of the method is characterized in that use is made of real or virtual reference marks which can be perceived by the person and whose presence and optionally position are included as further parameters into the state space of the Bayesian estimator, e.g. by a man/machine interface arranged close to the person, such as e.g. a button, a key, voice input.

Further, the method can be combined with optical SLAM methods known from robotics by including, into the determining of the state space of the Bayesian estimator, the visual features measured by optical sensors, e.g. by entering them as contributing factors into the weight computation and/or as the "importance sampling" step of the particle—e.g. as a multiplicative term in the weight, wherein each particle now also carries the state of each observed visual feature and adapts the location and spatial position and the accuracy thereof to the current observation of the features and of the other conditions of the particle, and wherein, further, in the same manner, also features of ultrasonic or infrared or microwave sensor systems can be used which thus can be considered and used as parts of the created map and/or can improve the creating of the map on the basis of odometry.

Further, use can be made of magnetic sensors (e.g. electronic magnetic field sensors), by including the respective strength and direction of the local magnetic field as a feature and entering them corresponding to a visual feature into the computations.

It can be provided that the person is provided with a plurality of sensors for reducing odometry errors (e.g. the drift), wherein an improved odometry can be achieved by combining the measurement signals of the plurality of sensors (e.g. averaging of the odometry information or averaging the raw data of the sensors).

Further, it can be provided that sensors for odometry are placed on parts of the body other than the feet/shoes, and that methods known from Pedestrian Dead Reckoning are used for computation and respectively improvement of the odometry.

As a proposal density of the Bayesian estimator (e.g. particle filter), use can be made of the following mathematical product: the conditioned likelihood density of the current odometry errors E, conditioned to the odometry errors in the last time-instant step, multiplied by the conditioned likelihood density of the current pedestrian step vector U, conditioned to the current odometry information $Z^u$ and the current drift parameter E.

A map in the sense of the invention is to be understood as comprising location-related data on the likelihood of the future movement of a person in a spatial environment (P-map). When creating such maps, use can be made of data on transition probabilities over edges of spatially arranged polygons (e.g. hexagons, rectangles, triangles, other polygons), wherein, in case of realization by means of a particle filter, the edge transitions of the particle at each polygon transition for this particle are counted and included into a weight computation.

If polygons are used, the counters are preferably updated and stored only for one edge between two adjacent polygons and not individually for all edges of all polygons, whereby the required storage capacity can be distinctly reduced.

Suitably, use is made of visual odometry methods known from robotics (e.g. the "Lucas Kanade" or "Focus of Expansion" methods), wherein, with the aid of optical sensors (e.g. camera), use is made e.g. of the change of the appearance of the environment for estimating the change of location and position of the person.

When using polygon representations (e.g. hexagon) of the map, it is preferred that the polygon grid is adapted to the environment so as to be configured with varying density, wherein the polygons can overlap and/or a plurality of polygon planes can be used hierarchically and the transition counters are computed separately for each plane, and wherein, in the weight computation of the particle (of a particle filter), all planes are included (e.g. multiplicatively in the weight), and then, as a map, there will be output e.g. all planes created in this manner.

When using polygons for the map, the polygons are configured with overlap or without overlap and/or are regular or irregular and/or are configured in a plurality of planes.

If polygons are used for the map, use is made, instead of using a polygon grid, of a regular or irregular arrangement of circles or ovals or other geometric shapes, wherein, instead of counting an edge transition, there is detected the angle via which the shape is left during a pedestrian step or part of a pedestrian step, and for this angle (in suitable random quantization, i.e. range-of-values division), an angle range transition counter is evaluated and updated (in analogy the edge counters for the hexagons in the embodiment), wherein, in case of an overlapping pattern of shapes, there is always selected that shape whose center is closest to the particle, and, in analogy with the realization by hexagons, the angle range transitions are counted and included in the weight computation.

Suitably, there are evaluated not only the counters for edge transitions and respectively angle range transitions per hexagon or other structure but also those for each combination of any number of previous transitions.

When creating the map, use can be made of already created maps of other users or other walks of a person (for example, the "a-priori" counters for edge transitions of polygon maps can be placed onto already measured transition counters and/or an iterative processing can be performed wherein the map creation for an odometry data set is continuously repeated using mutually created maps).

Suitably, the created map represents three spatial dimensions (for example, for an application in three dimensions, use can be made of columnar geometric surfaces with polygon-like footprints and a flat or oblique bottom or roof (the height being e.g. from 0.5 m to 5 m), wherein, e.g., in analogy with the two-dimensional version of the polygon map, the transitions are counted and evaluated by the therein defined walls or bottom and roof surfaces (in a two-dimensional map, transitions are observed via lines and, in a three-dimensional map, transitions are observed by surfaces).

The method will be explained in greater detail hereunder by way of an embodiment and with reference to the drawing.

FIG. 1

Schematically shown in this Figure is the dynamic model for a Bayesian estimator, with DBN designating a dynamic Bayesian network, $Z^u$ designating the pedestrian step estimation (odometry information), E designating the odometry error conditions, U designating the real pedestrian step and P designating the "pose", and M being time-invariant for the duration of the computation (map determination period), i.e. being identical for all time-instant steps k. M designates the location-related data on the likelihood of the future movement of a person in a spatial environment.

FIG. 2

This Figure shows the definitions of the "pose" (position in space) and of the pedestrian step vector for the subsequent Figures and examples. Designated by $P_{k-1}$ is the (old) position in space at the time k−1, and $P_k$ designates the (new) position in space at the time k. Designated by $U_k$ is the pedestrian step vector, i.e. the translation of the new position in relation to the old position. The value k is an integral number. It will be increased by one with each cycle. This can occur e.g. at regular points of time (e.g. each second) or if the odometry computed a new pedestrian step, or if the pedestrian step length computed by the odometry exceeds a minimum length (in relation to k−1).

FIG. 3

In this Figure, two examples of odometry computations are graphically illustrated, wherein, in each case, pedestrians were walking in an office environment for about 10 minutes. Each point represents the estimated position of the foot at the time that the foot came to a standstill (i.e. when the pedestrian step was estimated). The odometry errors lead to a deviation of these positions from the real positions.

FIG. 4

This Figure schematically shows a system survey. The user can optionally carry with him/her further sensors such as e.g. GPS or WLAN receivers, an electric compass, further pedestrian step counters, a camera or the like. Optionally, an IMU mounted on the foot or shoe can be provided if the odometry is made possible by other sensors. The components of block 2b can be distributed in the system as desired, i.e. for example in the user device and/or on the shoe and/or as a computing unit in the data network.

FIG. 5

This Figure schematically shows a system survey. The user can optionally carry along further sensors such as e.g. GPS or WLAN receivers, an electric compass, further pedestrian step counters, a camera or the like. Optionally, an IMU mounted on the foot or shoe can be provided if the odometry is made possible by other sensors. The components of block 2a can be distributed in the system as desired, i.e. for example in the user device and/or on the shoe and/or as a computing unit in the data network.

FIG. 6

Figure 4:
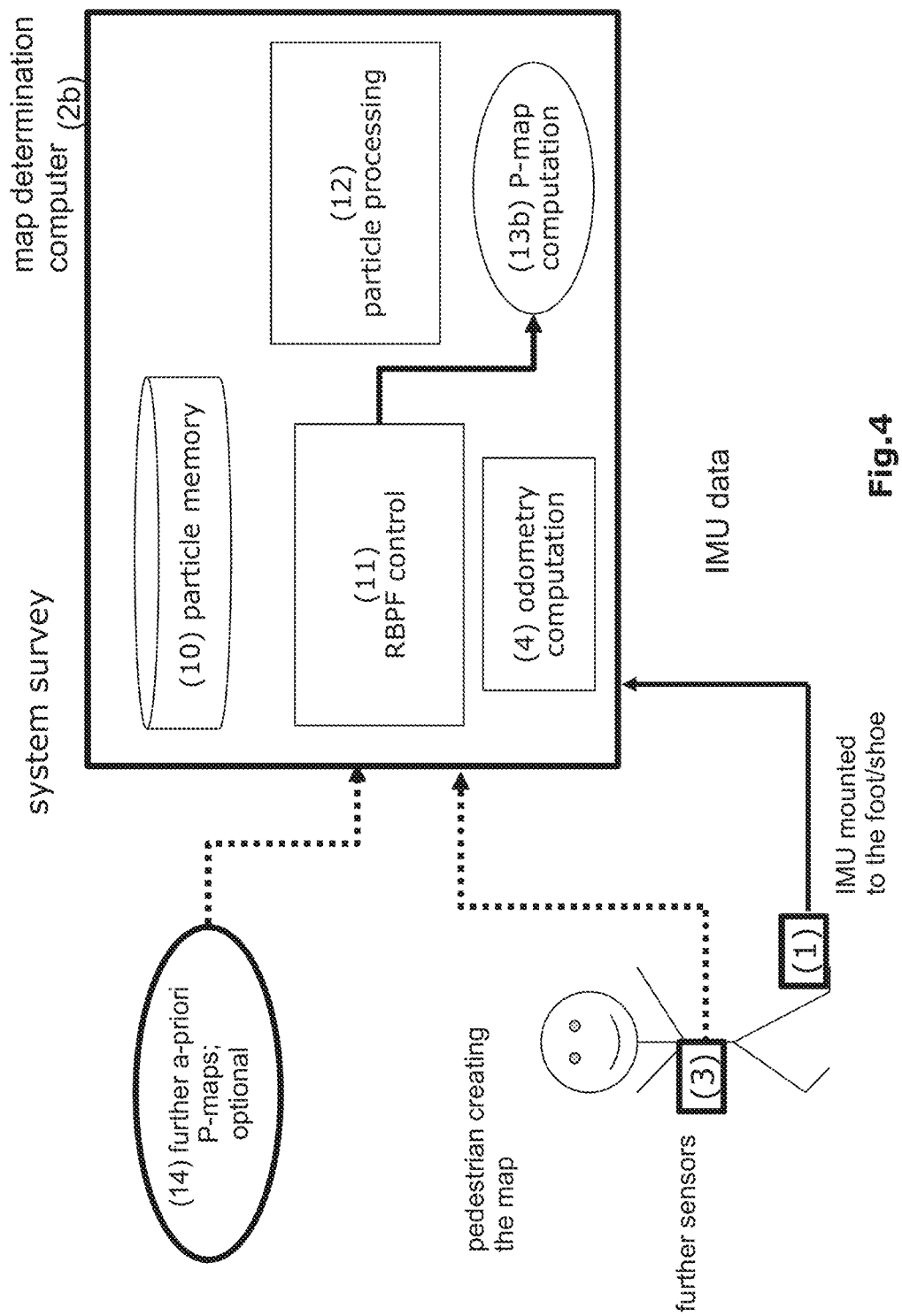
Figure 5:
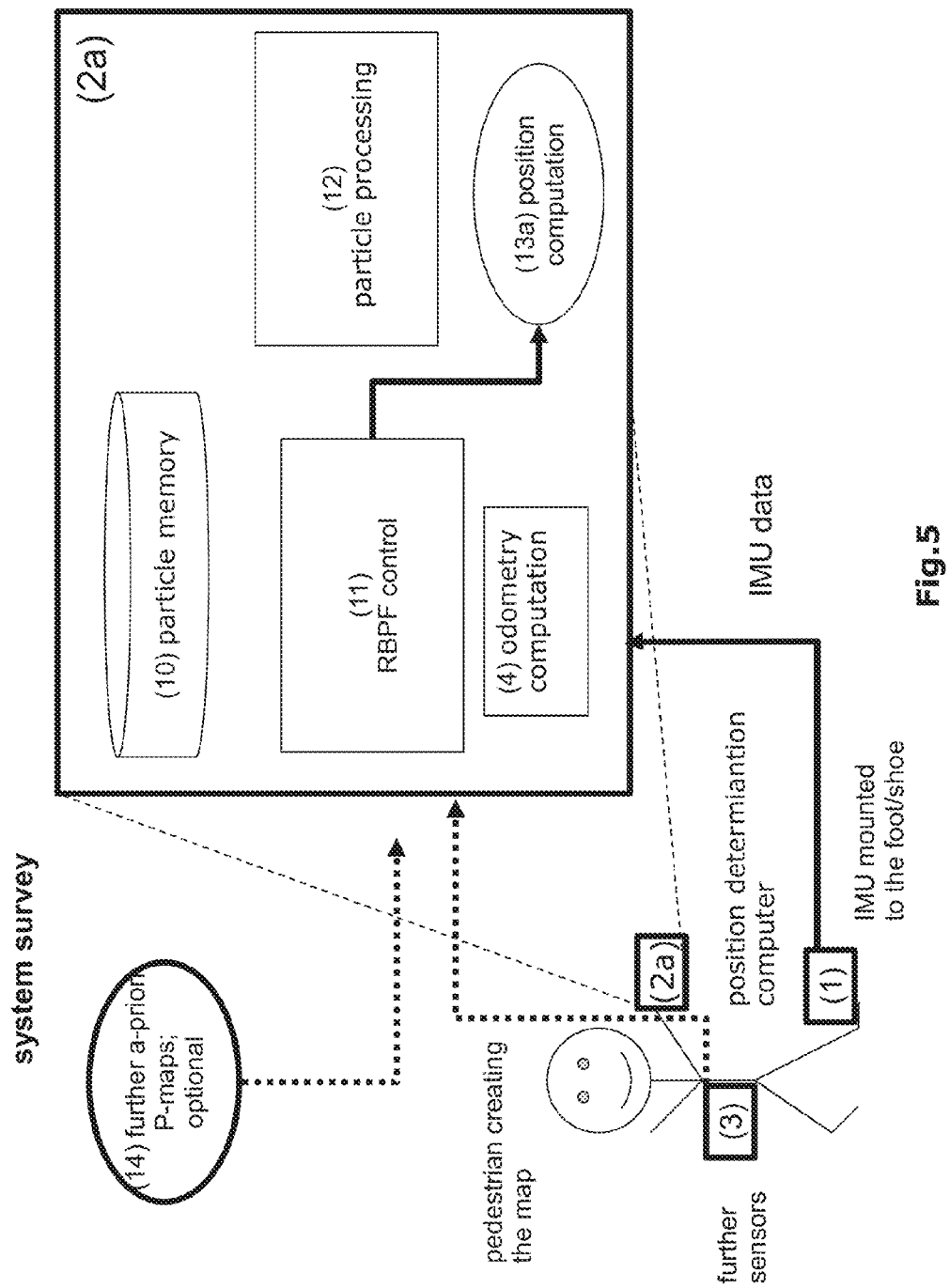

This Figure shows a schematic representation of the functional relationships between the blocks 3, 4 and 14 in FIGS. 4 and 5, respectively. Blocks 5, 6 and 8 will, at each time-instant step k, store their results as a hypothesis (particle) state in the memory. The RBPF control will be performed in the order of blocks 5, 6, 7, 8 and 9. Then, the new computation of the weight from blocks 7 and 8 and, in the given case, resampling will be performed.

FIG. 7

This Figure shows an exemplary definition of the coordinate systems and the angle and pedestrian step vectors, as can be used in one embodiment of the invention.

Figure 8:
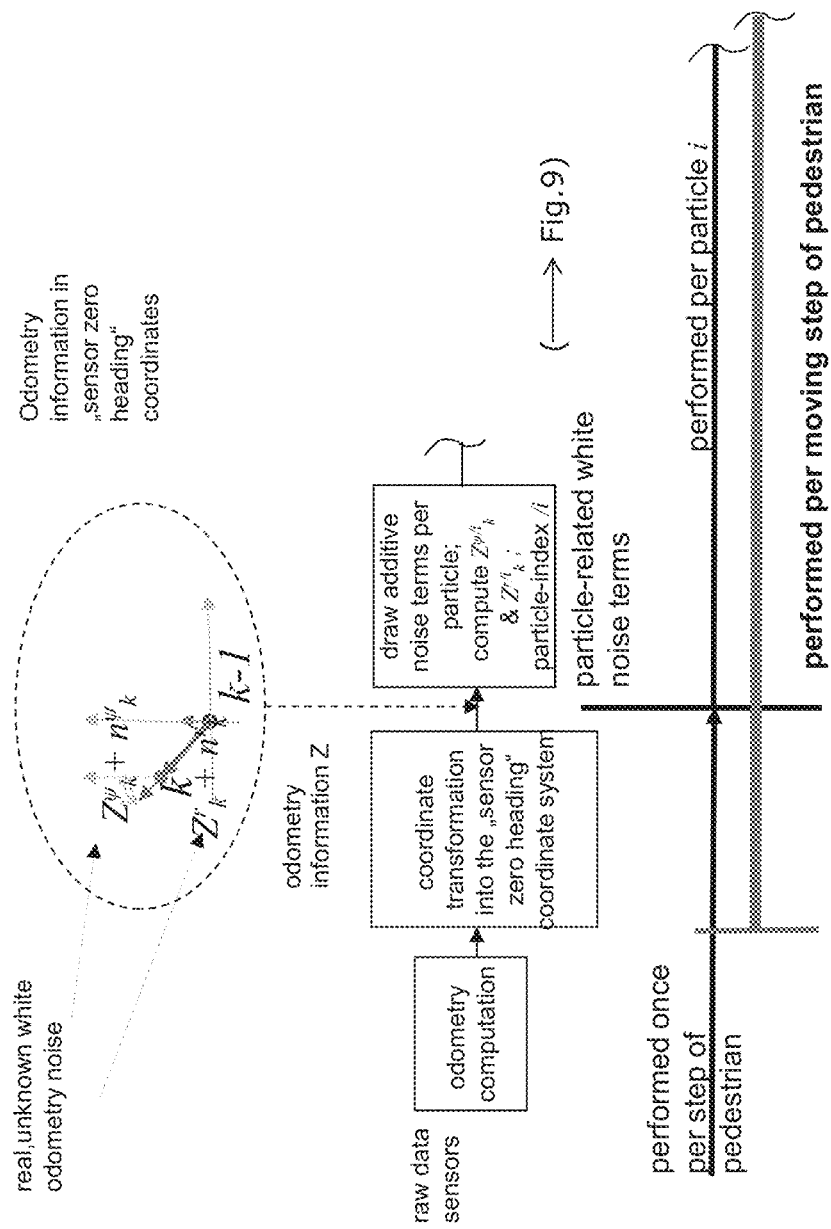
Figure 9:
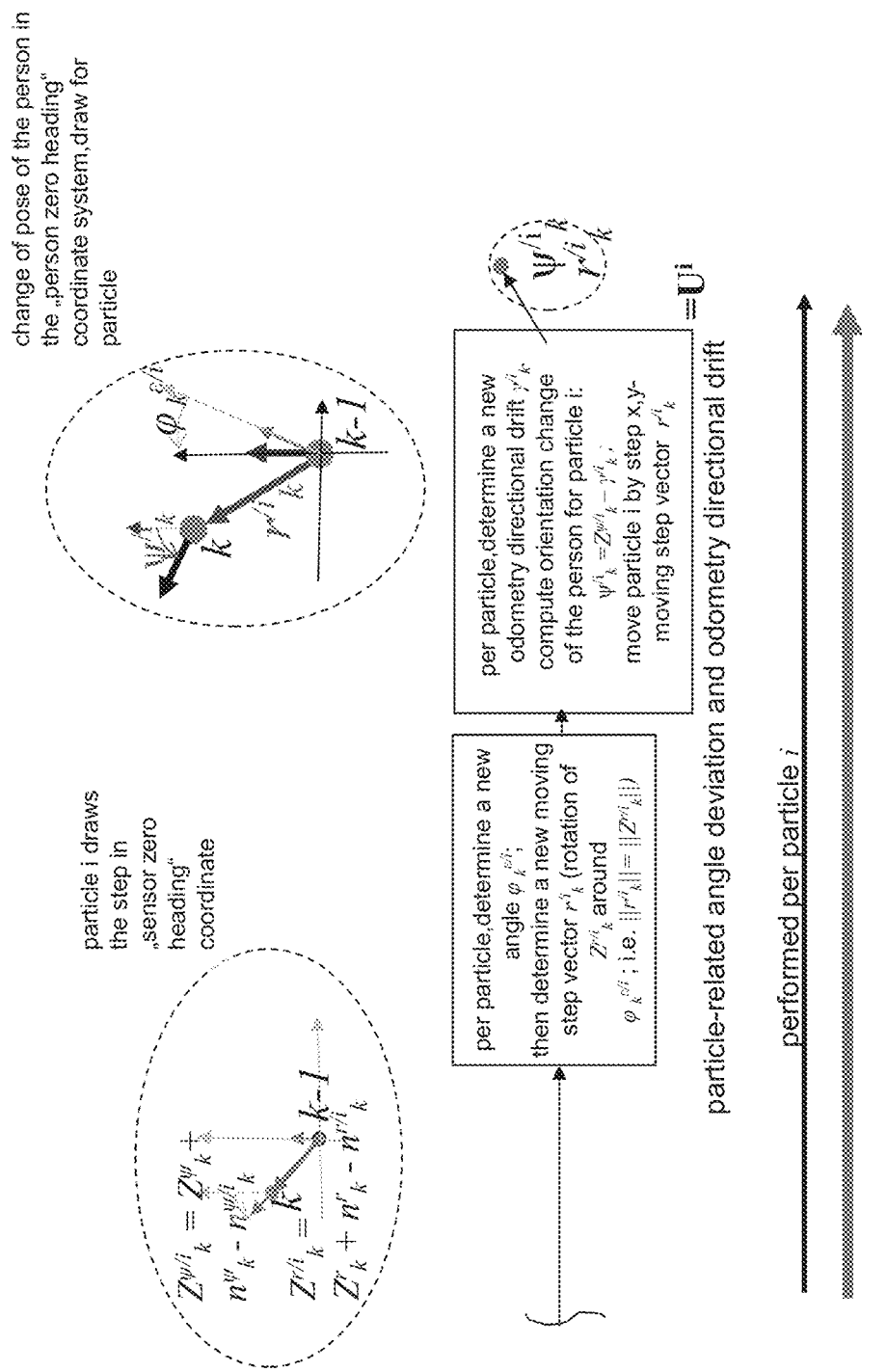

FIGS. 8 and 9

These Figures show the entire processing, starting from the raw data up to the determination of the odometry information, and further to the extraction of $E^i_k$ and $U_k$.

FIG. 10

This Figure shows, by way of example, two adjacent hexagons which can be used for the creation of the P-map.

FIG. 11

This Figure shows an example of a hexagon P-map with hexagon grid and hexagon edges, wherein, here, one pedestrian step leads to one of the neighboring hexagons.

FIG. 12

This Figure shows an example of a hexagon P-map with hexagon grid and hexagon edges, wherein, in this example, one pedestrian step leads to one of the hexagons beyond the next ones.

FIG. 13

This Figure shows the representation of a person (partly behind the hexagon) in a spatial environment.

FIG. 14

This Figure shows two examples of route maps for a building, as created according to the method of the invention.

The idea of the invention is the acquisition of a suitable map of the environment (i.e. a sort of building floor plan or route network or mixed forms of them) by evaluating data of inertial sensors which are worn by individual or a plurality of pedestrians. According to the invention, this is performed by use of a Bayesian estimator such as e.g. a Rao-Blackwellized particle filter (RBPF). Such methods are generally known from robotics (cf. Literature on SLAM—Simultaneous Localization and Mapping) but, as of yet, only in connection with the use of visual sensors or radar/sonar/laser-ranging sensors which will scan the physical environment or detect it by image processing and will process it in a Bayesian filter (e.g. BBPF or EKF) as a sensor signal). According to the invention, the creation of the map is based solely on pedestrian step estimation—while it can be improved by further sensors and information.

An example of the underlying dynamic model for a Bayesian filter is illustrated in FIG. 1. There is shown a dynamic Bayesian network (DBN) representing the causal relationships between the participating random variables. In accordance with the known understanding of DBNs as causal networks, the directions of the arrows indicate the directions of the effect of the causality (Uk has a causal effect on Pk, not vice versa). The meaning of the variables will be explained in the text hereunder. In the application, this DBN is illustrated because, in scientific circles dealing with Bayesian estimation algorithms, it is commonly used for clarification and for avoidance of unclarities and is widely understood.

Pedestrian step estimation is hereunder referred to as odometry: For odometry, use can be made of the method described by Foxlin in the above publication, but also other methods which do not necessarily require sensor devices for attachment to the shoe (e.g. measurement on other parts of the body—e.g. hip, trousers pockets—also in combination with a magnetic compass; these are often referred to as Pedestrian Dead Reckoning). In this regard, it is assumed that odometry will always yield more or less good estimations of the pedestrian step vector (This pedestrian step estimation is designated as $Z^u$ and in this application is partially also referred to as odometry information, and is the estimation of the real pedestrian step vector U) of the pedestrian (pedestrian step estimation: spatial vector in 2D or 3D related to the most recent pedestrian step or equivalent thereto, generally related to another point of time than the starting point. Cf. also FIG. 2). Two examples of the distribution of the estimated position according to odometry computation are presented in FIG. 3. It is to be noted that the definition of a pedestrian step can comprise not only a translation of the location of the foot or the person but also a change of the spatial arrangement (orientation) of the foot or the person. Thus, when a person makes a pedestrian step, the person's foot and respectively the sensor attached to it will change both its position in space and its orientation (direction); at the same time, the person's body will change its position (with regard to a site on the body) as well as the spatial orientation of an axis of the body (e.g. shoulder line or pelvis orientation). However, the translation and respectively directional change of foot and person are in a close relation to each other. In the two-dimensional world, consisting of coordinates x and y, the direction is always related to a direction in the x-y plane.

According to FIGS. 4 and 5, "System survey of map determination", the user carries an IMU (1) attached e.g. to the foot/shoe, and/or further sensors (3). A position determination computer (2a) performs the computation of the position, as will be described hereunder.

According to the invention, in case of an exemplary use of a particle filter, there are assigned, to each particle of the particle filter (comprising the components (11), (12) and (10), the following state variables:

1) various suitable time-variant or time-fixed odometry error states E for imaging the possible errors, such as e.g. fixed deviations and/or drifts, of the underlying odometry (e.g. angular deviation of the pedestrian step vector $Z^u$ per second, change rate of the angular deviation, length deviation factor, fixed angular deviations) for the current as well as for the most recent time-instant step of the particle filter.

Figure 2:
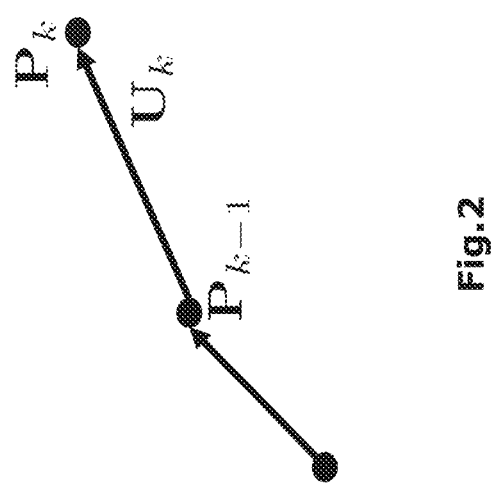

2) location coordinates and, in the given case, orientation in space, in a suitable relative or absolute location coordinate system (e.g. WGS-84, or relative to a corner of the building or relative to a starting point) for the current as well as for the most recent time-instant step of the particle filter. The current pedestrian step vector U is obtained as the change of the position and of the orientation from the most recent to the present time-instant step. This state variable is called the pose P and is shown in FIG. 2 together with the pedestrian step vector.

3) a suitable representation of location-related data on the likelihood of the future movement of a person in a spatial environment—herein referred to as a P-map. Embodiments will be explained hereunder.

Figure 6:
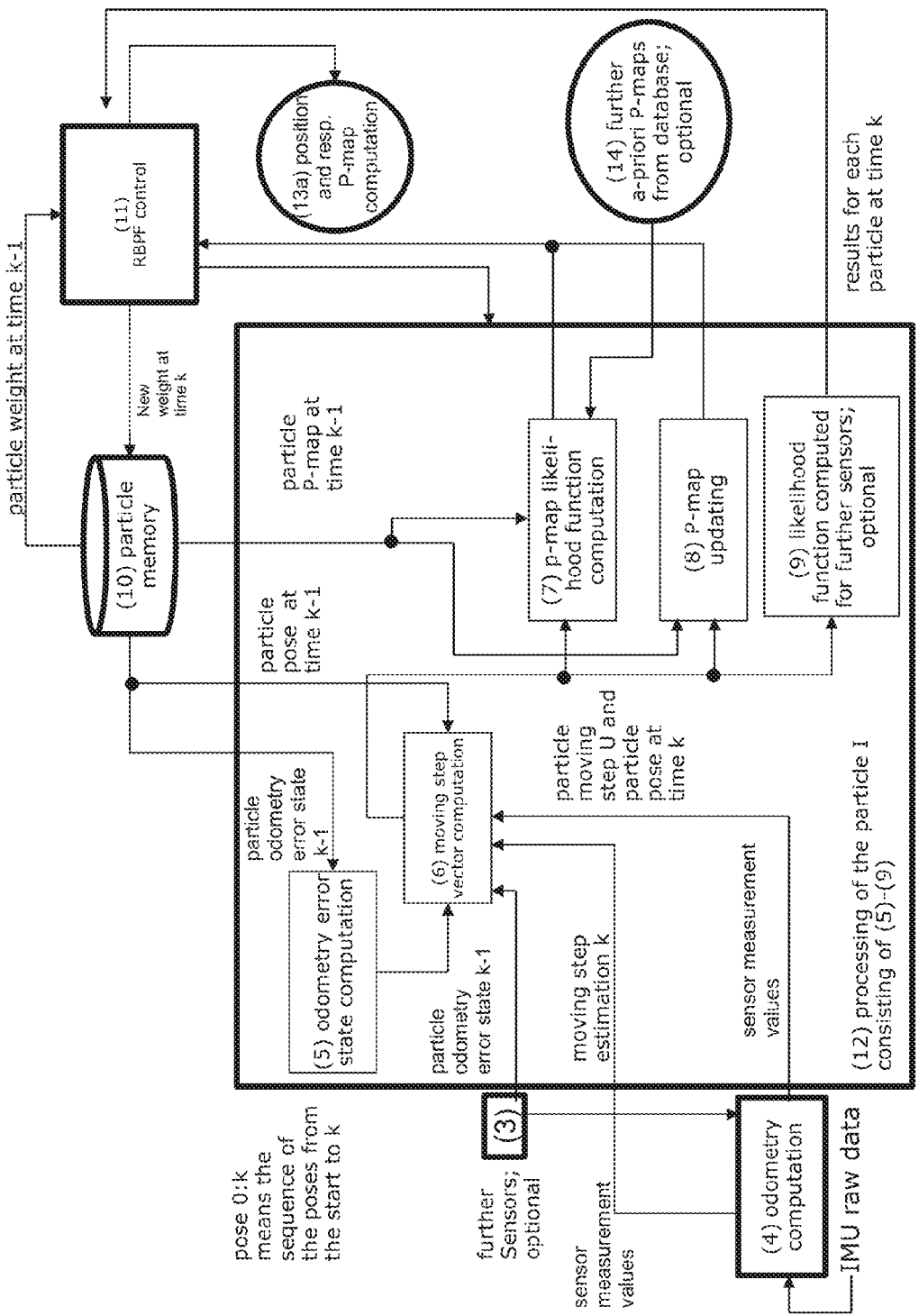

In each time-instant step, there is supplied to the particle filter the odometry information, i.e. the pedestrian step vector resulting from the unit (block) 4 of FIGS. 4 and 6, optionally with information on its reliability (i.e. in the form of a likelihood distribution or variance). The particles are now treated in two ways according to the known particle filter algorithm:

a) The state variables will be newly determined—optionally with the aid of a random generator. This is the known "importance sampling" or "proposal density drawing" step of the particle filter. The process is carried out in the components (5), (6) and (8) of FIG. 6.

b) Each particle will be newly weighted. This is the "weight update" step of the particle filter. The process is carried out in the components (7), (11) and optionally (9) of FIG. 6.

The exact manner in which these two steps are performed is in part freely selectable and is a function of the nature of the uncertainty of the odometry and of the P-map representation selected according to item 3) above. After the selection of the so-called "proposal function" has been made, the—according to Bayesian—optimum "weight update" computation will have been determined. Known approaches are referred to, among experts, as a "likelihood particle filter" or a "transition likelihood proposal function".

The P-map can be freely selected. However, for it to be useful, it should comply with some mathematical and practical criteria which will be enumerated hereunder. The P-map is understood as the likelihood density of a suitable random variable, M, of the map, as described further below. It should be selected such that the component (8) (FIGS. 4 and 6) can at least approximately determine the conditional likelihood density $p(M|P\_\{0:k\})$. Here, $P\_\{0:k\}$ is the entire sequence of the pose from the start of the measurements (time-instant step 0) to the current time-instant step k. Particularly, M should be selected to the effect that, over time, i.e. with increasing k, $p(M|P\_\{0:k\})$ substantially has an ever lower entropy in the sense of the known Shannon entropy. Also the conditional likelihood $p(U\_k|P\_\{0:k-1\},M)$ should be determinable at least approximately (component (7) in FIGS. 4 and 6). This term represents the influence of the P-map M on the next pedestrian step at the time k, as given with a specific pose history up to the point of time k−1. Preferably, however, one can approximate $p(U\_k|P\_\{0:k-1\},M) = p(U\_k|P\_\{k-1\},M)$, i.e. neglect the influence of older poses, the way this is the case in the hexagon P-maps explained hereunder.

An example of M and this distribution is an hexagon P-map. M represents edge transition probabilities in a hexagon grid. The likelihood density $p(M^i|P^i_{0:k})$ für Particle i is, in mathematical formulation, a suitable representation of an environment influencing the movement (P map). M accordingly is a random variable. $p(M| \ldots )$ follows a known beta distribution. When newly computing $p(M| \ldots )$, use is made of the transition of the pose from time k−1 to k, and the corresponding counters of the beta distribution are increased by one (cf. also FIGS. 10, 11 and 12). M is selected such that $$p(U_k^i|P_{0:k-1}^i, M^i)$$

can be computed, i.e. the influence of M on the next pedestrian step at the time k, namely at a given pose development from 0 to the time-instant step k−1. In the above example for hexagon P-maps, there applies:

$$p(U_k^i|P_{0:k-1}^i, M^i) = p(U_k^i|P_{k-1}^i, M^i) = konst \cdot \{M_{h(P_{k-1})}\}^{e(U_k)}$$

Further, the integral $$w_k^i = k_k \cdot w_{k-1}^i \cdot \int_{M_i} p(U_k^i | P_{0:k-1}^i, M^i) \cdot p(M^i | P_{0:k-1}^i) dM^i$$

must be determinable at least approximately (e.g. in component (7) of FIGS. 4 and 6). For particle i at the time k, one will newly compute w_k. The likelihood density is the influence of the random variable M on the movement (pedestrian step U) at the time k. The most recent term of the integral is the result of the component (8) from the most recent time-instant step; thus, it is the old P-map. The component (7) will compute or approximate this integral either implicitly (i.e. the integral can be expressed analytically) or by numerical or analytic integration during the real-time operation of the system. The normalization constant k_k will be computed in such a manner that the sum of the w_k over all particles will add up to one. In hexagon P-maps, $p(M| \ldots )$ is completely specified by the edge counters and a-priori counters. The integral is then generally solvable analytically. The integral does not have to be evaluated during the running time, which also applies to the terms in the integral (cf. FIG. 10).

Advantageously, M and $p(M|P\_\{0:k\})$ should be selected in such a manner that the integral can be determined analytically, as is the case in the hexagon P-maps to be explained later on.

Advantageously, after computation of the weight of all particles, the weights will be standardized to the sum 1, and there is performed an optional "re-sampling" step (known in the field). (This can be performed e.g. again in the component (11) of FIGS. 4 and 6.).

As an exemplary realization of the above, let it be mentioned that, as a "proposal density" for the drawing of each particle at each time-instant step, the following mathematical product can be selected with advantage:

The conditional likelihood density of the current odometry errors E, conditioned to the odometry errors in the last time-instant step (e.g in the component (5) of FIGS. 4 and 6), multiplied by the conditioned likelihood density of the current pedestrian step vector U, conditioned to the current odometry information $Z^u$ and the current drift parameter E (e.g in the component (6) of FIGS. 4 and 6).

In the components (5) and (6), the following is performed:
(5): draw a new $E_k^i$ from the distribution $p(E_k|E_{k-}^i)$
Example of E and this distribution:
E represents a time-variant pedestrian step angle deviation ("bias") and a temporal change rate ("drift") from $Z^u$. Both state variables are independent and follow a "random walk" process of chance and thus each represent one of two multiplicative factors of $p(E| \ldots )$.
(6) draw a new pedestrian step vector $U_k^i$ from the distribution:
New odometry error state for particle i $$\downarrow$$
$$p(U_k|Z_k^U, E_k^i)$$
$$\uparrow$$

Pedestrian step estimation at the time k (2D-vector)

In practice, this means that, for each particle, there has to be first drawn, in a random or pseudo-random manner, a new odometry-error parameter set—conditioned to the old ones, and that there is then drawn, in regard to this new odometry-error parameter set and the current odometry data, a new pedestrian step vector in a random or pseudo-random manner ("proposal density drawing"). Using the selected new pedestrian step vector, the new position and orientation is computed, and the system state of the particle is stored. In practice, the distribution from which the drawing is performed can be the normal distribution; the variants therein will result from the real quality characteristics of the odometry sensors and can be determined e.g. experimentally.

Figure 7:
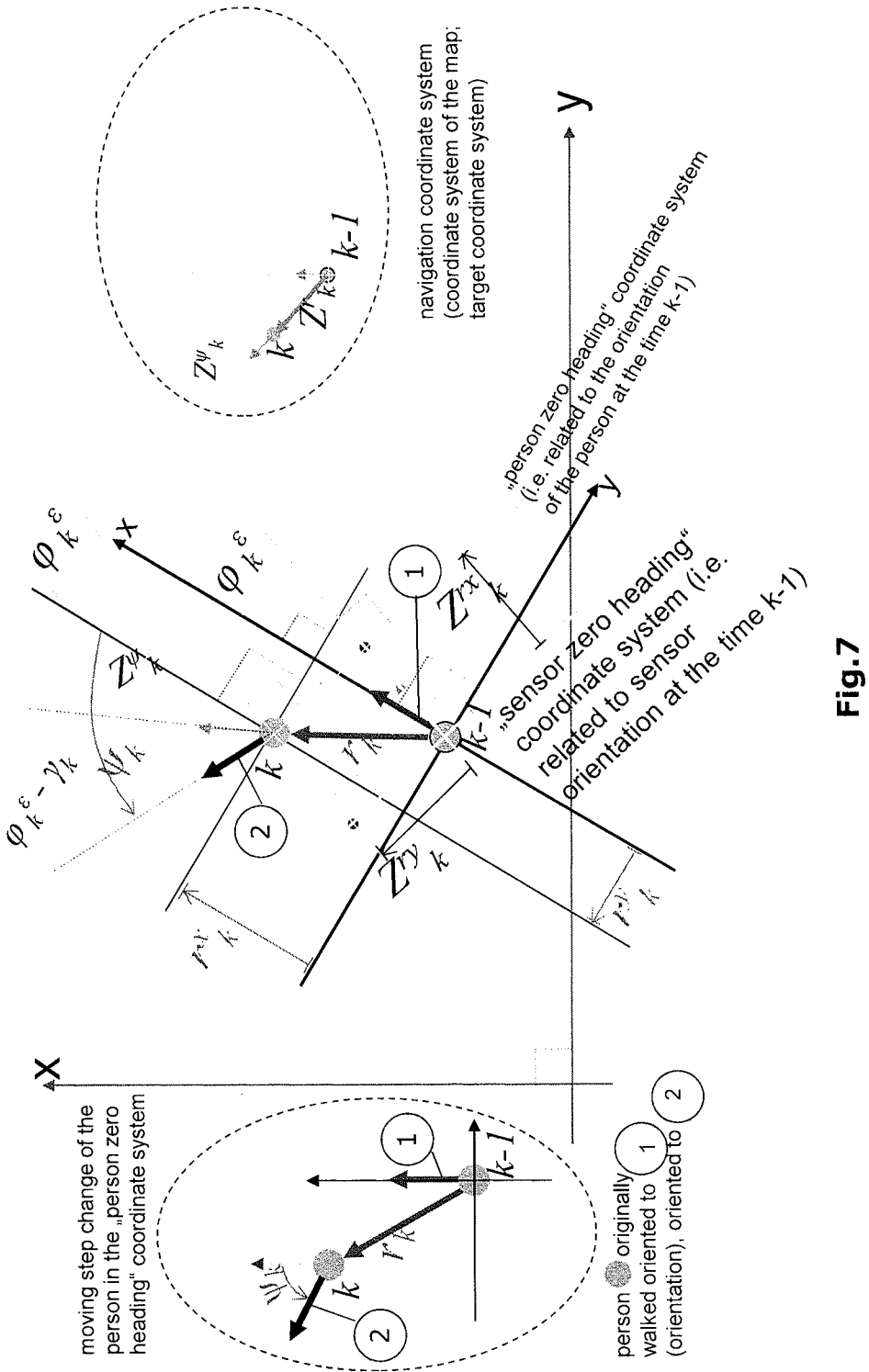

FIG. 7 shows the coordinate system used in the present example, with angles and pedestrian step vectors. For the symbolics used, there applies:
Odometry information: $Z^U_k = \{Z^r_k + n^r_k; Z^\psi_k + ^\psi_k\} = \{(Z^{rx}_k + n^x_k, Z^{ry}_k + n^y_k); Z^V_k + n^\psi_k\}$
pedestrian step vector U: $U_k = \{r_k; \psi_k\} \{(r^x_k, r = ^v_k); \psi k\}$; mit $\|r_k^*\| = \|Z^r_k\|$ For the Odometry measurement $Z^U$ we can state: $Z^U=Z^r_k+$ noise vector $n^r_k$; and direction change $Z^\Psi_k$+noise $n^\Psi_k$ U represents the true moving x,y—step vector in the form of $r_k$ (red) as well as the true orientation change of the person $\psi$.

ψ: Angular difference between the orientation of the person and the sensor orientation γ: Odometry heading drift $\gamma_k = Z^\Psi_k \psi_k$ The whole processing sequence is shown in FIGS. 8 and 9. In these Figures, there applies:

$$E^i \begin{cases} \text{Noise terms are drawn randomly from a} \\ \text{zero mean normal distribution} \\ \text{Calculation of } \psi_{k,eli} \text{ follows a random walk process;} \\ \text{optionally clipped} \\ \text{Calculation of } \gamma^{li}_k \text{ follows a random walk process} \end{cases}$$

(Notice: $U^i$ is in the "person zero heading" coordinate system, i.e. with respect to the most recent orientation of the person at the time k.)

Figure 10:
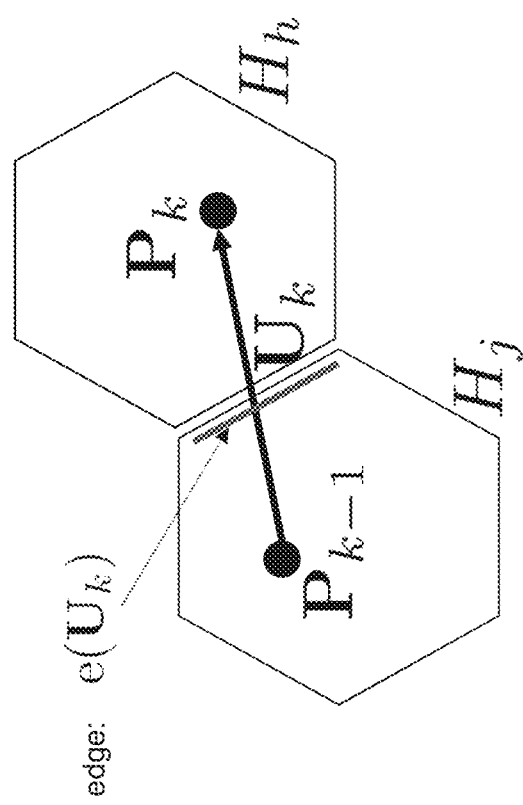
Figure 11:
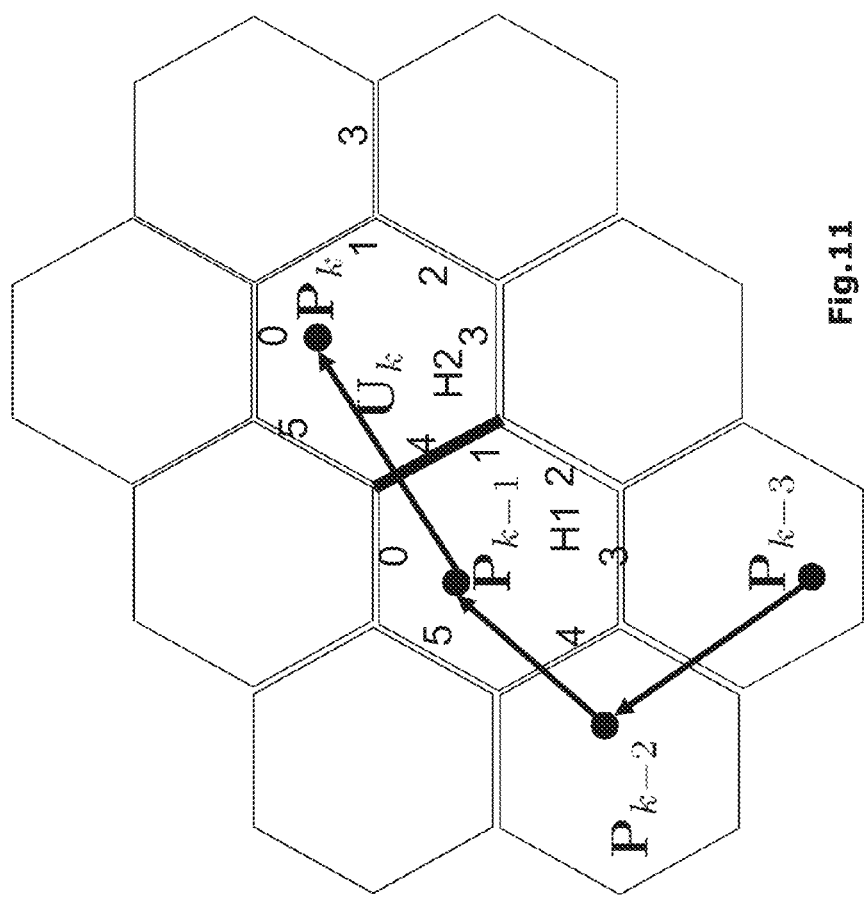
Figure 12:
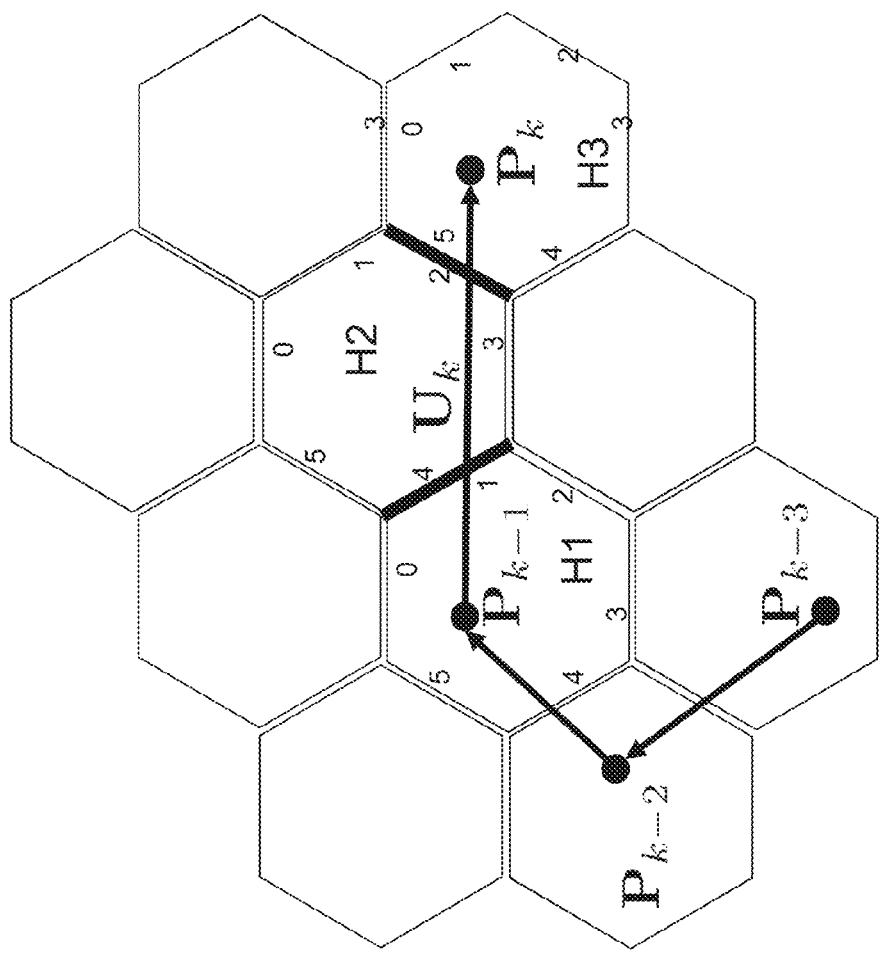

Now, according to the exemplary realization by hexagon P-maps as shown in FIGS. 10, 11 and 12, the computation of the weight of the particle is carried out as follows ("weight update", see components (7,9,11) in FIGS. 4 and 6):

New weight=old weight multiplied by product_{j=0 to Ns−1} (N(h(j), e(j))+a(h(j), e(j)))/(N(h(j))+a(h(j))); if the new pedestrian step leads the particle out from a hexagon or:

New weight=old weight multiplied by 0,25; if the new pedestrian step does not lead the particle out from a hexagon.

For FIG. 10, it holds true that Ns=2 since the pedestrian step K pertains to merely two hexagons. Further, there applies:

$$M_{h(P_{k-1})}^e(U^k) \triangleq M_h^e \triangleq P(P_k \in H_j | P_{k-1} \in H_h)$$

so that $H_j$ is reached from $H_h$ via $U_k$ and j≠.

For Ns=2, there further applies:

$$w^i = k_k \cdot w^i_{k-1} \cdot \left\{ \frac{N_h^e + a_h^e}{N_h + a_h} \right\}^i$$

N are edge counters and respectively the sum for all edges of a hexagon. In analogy thereto, alpha denotes the a-priori counters.

In FIGS. 11 and 12, the digits 0, 1, 2, 3, 4, 5 designate the edge numbers of respectively one hexagon. According to FIG. 11, in the transition of a particle position from $P_{k-1}$ to $P_k$ of the weight computation in component (7), the counter of edge 1 of hexagon H1 is incremented, and optionally the counter of edge 4 of hexagon H2 is incremented. In the weight computation in component (7) of the particle, the counter of edge 1 of hexagon H1 (with respect to the sum counter of hexagon H1) is used. According to FIG. 12, in the transition of a particle position from $P_{k-1}$ to $P_k$ after the weight computation in component (7), the counter of edge 1 of hexagon H1 is incremented and the counter of edge 2 of hexagon H2 and optionally the counter of edge 4 of hexagon H2 and the counter of edge 5 of hexagon H3 are incremented. In the weight computation of the particle, use is made of the counter of edge 1 of hexagon H1 (with respect to the sum counter of hexagon H1) and the counter of edge 2 of hexagon H2 (with respect to the sum counter of hexagon H2).

Figure 13:
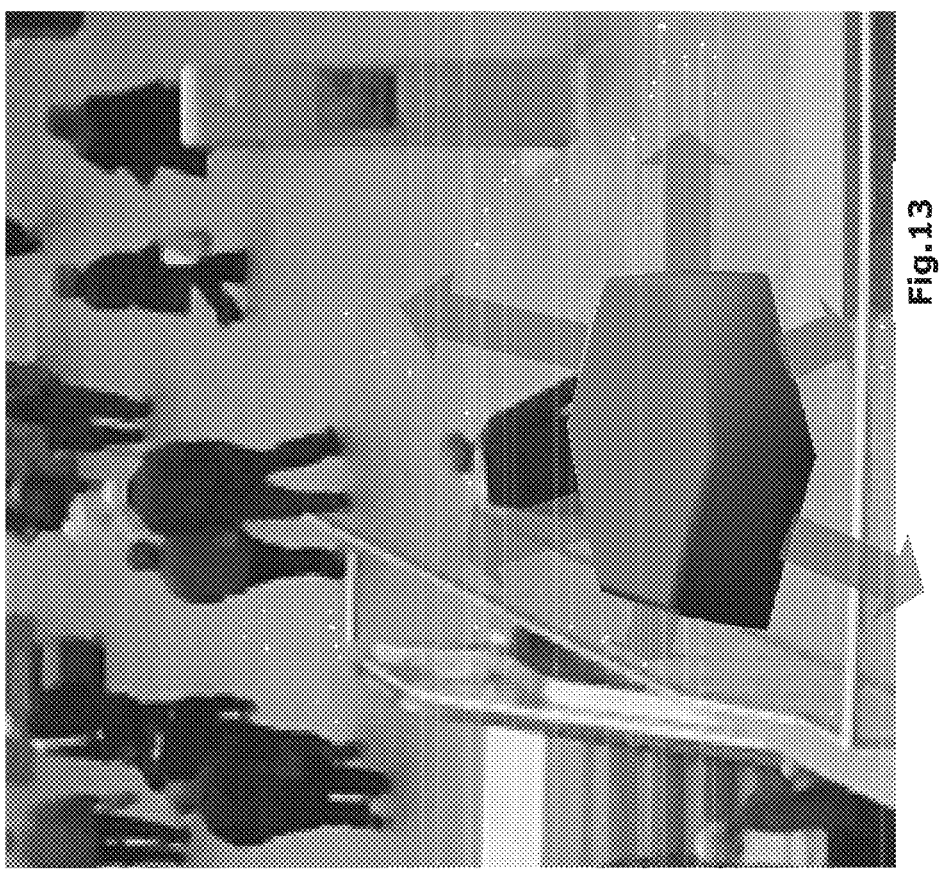

For ease of understanding, reference is made to FIG. 13, showing an individual hexagon of a hexagon P-map representing the probabilities of the possible movements of the person at this location. In this example, the arrow length is proportionate to the likelihood of a transition over the respective hexagon edge—it is unlikely that the person, when viewed from the rear, will walk to the left or to the rear. Typically, the hexagon radius is selected to be 0.25-1 meter.

In this embodiment—for an application in two spatial dimensions—the above mentioned terms N(h(j), e(j)), a(h(j), e(j)), N(h(j)), a(h(j)), and Ns are determined and respectively used in the following manner:

The 2D local area will be subdivided into a regular hexagon grid (hexagon radius e.g. 0.5 m).

The index h(0) precisely defines the x- and y-position of the center of that hexagon which the particle left in the most recent pedestrian step.

The index h(Ns) precisely defines the x- and y-position of the center of that hexagon which the particle reached as a result of the most recent pedestrian step.

All hexagons which are still passed through (if any) will be indexed, in the ascending order of leaving, by h(j), wherein 0<j<Ns. In FIG. 12, for instance, Ns=3, and in this Figure, h(0) is equal to H1, h(1) is H2, and h(2) is H3. For Ns=2, FIG. 10 holds true as an example.

In a similar manner, 0<=e(j)<6 defines the edge of the hexagon h(j) via which it was left.

The number N(h(j), e(j)) is the number of all past events (for this particle) where the hexagon with the index h(j) was left via the edge e(j), i.e. indicating how often the path of this particle crossed the respective edge. This term is referred to as an edge counter. In this case of the hexagon P-maps, N(h(j), e(j)) is also the representation of an environment influencing the movement, as initially described. This representation is computed into the map, as explained later on.

The number N(h(j)) is the sum counter of the hexagon and represents the sum of N(h(j), e) for e=0 to 5.

The number a(h(j), e(j)) is a positive number, in principle selectable at random, which can be interpreted as an "a-priori" counter (the English term, known from Bayesianian estimation theory, being "virtual counts") and which includes previous knowledge on the ability of this hexagon to pass across this edge.

Thus, further, a(h(j)) is the sum of a(h(j), e) for e=0 to 5. It is also possible, for instance, to generally use a value of about 1 for each a(h(j), e(j)).

Advantageously, one will increment N(h(j), e(j)) for a particle not only for the polygon (e.g. hexagon) which has been left but one will act as if the human step had also performed the transition in the reverse order and will also increment the corresponding edge of the polygon which has been reached (as in the examples from FIGS. 11 and 12). Advantageously, the fraction in the term for the weight computation will be corrected for geometric non-uniformities of the polygon grid since, depending on the passage direction of the respective particle, e.g. through a hexagon grid, slightly different numbers of edges will be crossed for a fixed and linear length of path, which otherwise would cause a wrong preference given to some directions and thus of some particles because the fraction in the formula for weight computation is always smaller than 1. Advantageously, the fraction in the term for weight computation will be corrected by different length of the current pedestrian step vector of a particle since, otherwise, particles which accidentally represent rather shorter pedestrian steps would erroneously be favored because the fraction in the formula for weight computation is always smaller than 1. This can be performed e.g. in that the fraction is raised to the power of a number z, wherein z comprises the length and/or direction correction (e.g. linear standardization to the number of hexagon transitions with respect to a length of path of one meter and to a uniform direction in the hexagon grid.

The determination of the map itself is performed in the component 13b in FIGS. 4 and 6 after termination of a walk by evaluation of the representation, stored in the state variable, of each particle's environment influencing the movement (P-map or map M, hereunder simply referred to as map), in the above example e.g. the number N(h, e) or also the fraction (N(h, e)+a(h, e))/(N(h)+a(h)) for all hexagons h and all edges e. There will be taken either the map of the particle having the largest weight, or the map averaged in a weighted manner across all particles, or other methods known in the literature on particles. In the weighted averaging, it is e.g. the transition counters that can be averaged in a weighted manner. In such a form, the map can be used directly in the positioning of a pedestrian at a later time—in the above example, it will, permanently or as a "a-priori" counter, replace the corresponding values during the later positioning with or without recomputation of the map. However, the map can also be further processed (by application of random further functions), e.g. by application of local-area filters or edge detection algorithms so as to obtain a graphic representation of the map and respectively the environment. In the above exemplary embodiment, use can be made of the (weighted-with-averaging) edge transition counters computed from the particles, for detecting walls and obstacles (edges without or with only few transitions). In the process, non-linear functions such as e.g. a hard limitation, Sigmoid functions or thresholds can be used so that different values of the map transition counters can be reflected in the map in a differentiated and non-linear manner.

ADVANTAGES OF THE INVENTION

The above described method has the advantage that such particles will be rewarded which due to their odometry-error and pedestrian step hypotheses will often appear at the same edge transitions of the hexagons again. This is what also a person will do when moving about within an environment delimited by walls: at doors, in corridors, at crossings and at similar obstacles and junctures, the pedestrian will select one of the physically possible transitions—he/she will not walk through walls. Thus, if a pedestrian repeatedly enters the same areas (i.e. for example the above hexagons), preference is given to such particles (hypotheses) which represent the same patterns of movement. After some time, there will "survive" only such particles by which the real movement history of the pedestrian is more or less correctly imaged—and, thus, the map. This, accordingly, makes it possible for a person e.g. to walk into a building—using the most recent known position obtained by satellite navigation (e.g. GPS)—and then, in the building, to compile a map, under the precondition that an area is re-entered with sufficient frequency. (In practice, one further visit will often suffice.) The drift of recent sensors nowadays is so good that the positioning can often be performed for several minutes with a precision in the range of a few meters even though the pedestrian has not re-entered any areas. In this time period, it is highly likely that e.g. a stretch of a route has been walked on in the opposite direction, or that a corner in a corridor has been passed several times in the same manner.

Further, the method is capable of detecting—and acquiring knowledge of—not only walls but also influences such as furniture, partition walls and other obstacles. As a result, there is obtained a closer linkage of person's movement to the environment, which will increase the positioning accuracy. Further, the method can also detect changes in the environment such as e.g. changes of inner and outer walls, shifting of larger pieces of furniture, new partition walls, etc.

Figure 14:
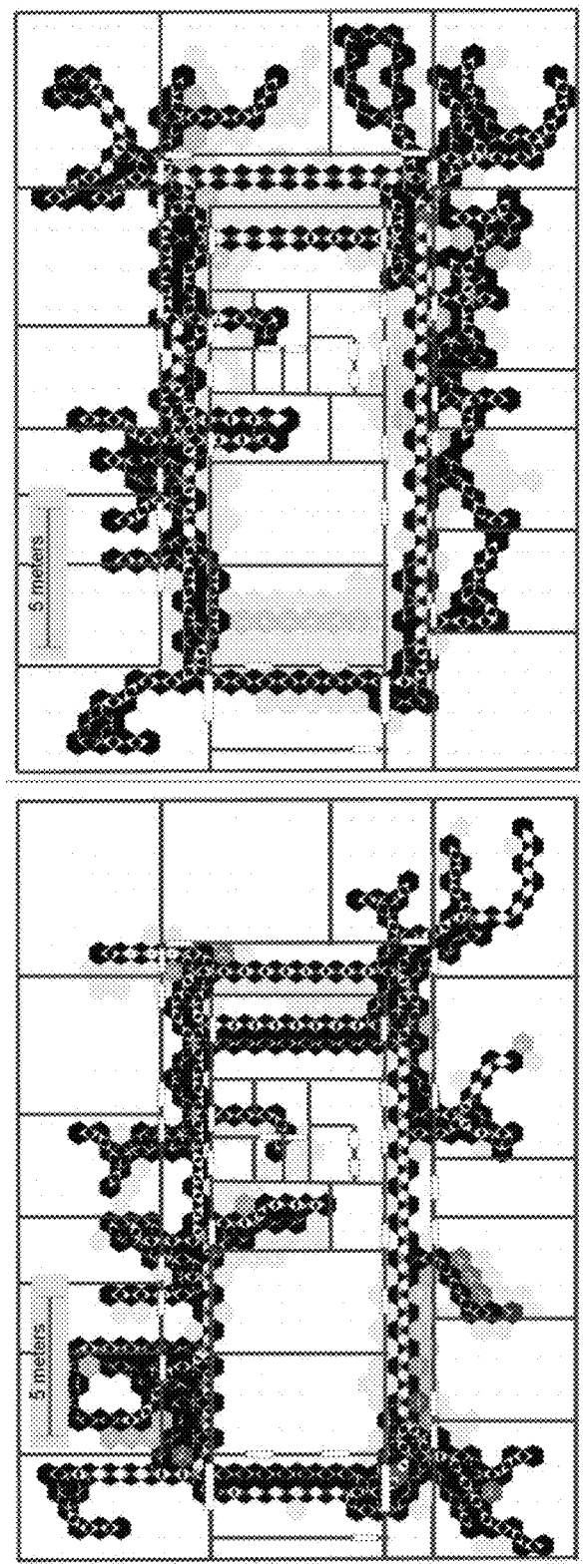

Illustrated in FIG. 14 are two examples of created hexagon P-maps for respective independent walks of a person in a building during about 10 minutes each time. During this period, the person has passed several times through the inner looped corridor and has entered some of the rooms. Method: In this example, there was used a Rao-Blackwellized particle filter with about 30,000 particles.

Background outline: Real floor plan—here, only for comparison

Black hexagons: the P-map which by the method was computed to be the most probable one. This P-map is also the P-map in the state of the particle which on the whole receive the best cumulative weight.

Medium black (grey) hexagons: hexagons which belong to somewhat less probable but still not improbable P-maps.

The larger the holes in the hexagons are, the more frequently this hexagon has been "visited" by the best particle.

White areas: these were not visited by the best particle.

Extensions

In practice, one will include also data of further sensors into this method, which will further improve its reliability: e.g. satellite navigation, magnetic compass, WLAN measurements for positioning, mobile phone position measurements, UWB measurements for positioning (e.g. in component (3) of FIGS. 4 and 6). Further, one will use known portions of a building floor map in order to restrict the particle movement—e.g. the outer walls.

A further possibility for improving this method is the use of real or virtual reference marks. In the context of the invention, a reference mark is a feature of the environment which a person will be able to recognize again (e.g. a specific door, a corner of a specific room, etc.) In a virtual reference mark, the site (in the coordinate system of the system) of this reference mark does not have to be known.

The system uses these virtual reference marks in the following manner: When a person encounters a new suitable reference mark for the first time, the person will give a signal to the system in a suitable manner. This can be performed e.g. in that the person will input a special number into a portable end device (e.g. mobile phone) or will push a dedicated key on the device. Or the person will move his/her foot on which the sensors are applied, in a specific manner (e.g. by softly tapping onto the floor two times, which can be easily detected by the system from the sensor data). The person himself/herself can freely select the reference mark and respectively decide on which sites he/she wants to place the reference mark. Or, however, a reference mark has already been physically marked as such or has been described to the pedestrian in such a manner that it will be detectable.

The particle filter will now assign, to each particle, a further state variable for this new reference mark, said state variable comprising the following information: the current location of the particle (copied from the state variable thereof) and, appertaining thereto, optionally a representation of the spatial accuracy (e.g. variances, likelihood density function) and an identification number. If only a virtual reference mark is allowed or if the explicit identification of the reference mark is evident e.g. from the name allocation in a software realization, no identification number has to be stored. Now, if the pedestrian in the further development again encounters this virtual reference mark, he/she will again give the new signal (e.g. producing the same movement pattern with the feet or push the same button/numerical key). Then, in the above example, in the "weight update" step, the weights will be evaluated with a further multiplicative factor. This factor is a function (called F1) of the current local coordinate of the particle and the stored position of the reference mark and the spatial accuracy of the particle as determined as of yet. This function can be selected as desired but preferably is selected in such a manner that the factor is the larger the closer the two coordinates are to each other and the higher the current spatial accuracy is. Further, the position of the reference mark stored for each particle and the as yet determined spatial accuracy of the particle will be newly computed in that e.g. the position will be taken from the average value of all observed positions, and the spatial accuracy will represent the variation of all observed positions (e.g. the variance; for this purpose, also a Kalman filter can be used).

If the pedestrian does not give a signal, all particles will nonetheless be weighted in the "weight update" step with NIv further multiplicative factors. NIv herein is the number of the as yet determined virtual reference marks. These factors are respectively computed as follows: They are also a function (referred to as F2) of the current local coordinate of the particle and the stored position and its as yet determined spatial accuracy. This function F2 can be selected as desired but preferably is selected in such a manner that the factor becomes smaller the closer the coordinates are to each other and the higher the current spatial accuracy of the reference mark is. When a reference mark is observed, the "weight update" step optionally does not only comprise a multiplicative factor related to this reference mark, but comprises this factor multiplied by (NIv−1) further factors related to all (NIv−1) now unobserved reference marks, as has been described. In the form of the above mentioned functions, consideration has also been given to the fact that pedestrians particularly may forget to report a reference mark, and that it may also (more rarely) happen that a pedestrian reports a reference mark although he/she is not near it. The adapting of these two functions F1 and F2 to these error sources is suitably achieved in that their values will not become too small when the respective included positions are more remote (in the function F1) and respectively are nearer (in F2). In a similar manner, F1 and F2 can be adapted in such a manner that reference marks will be reported by the pedestrian also in a larger environment by being, in the mathematical sense, less discriminating ("sharp") with respect to the positional differences.

In contrast to the also described virtual reference marks, real reference marks are observed and are processed in the system in a similar manner. The difference is that the positions of these real reference marks have to be known to the system. Thus, the step of newly computing the position of the reference mark is eliminated. Further, the system will right from the start work with NIr real reference marks, and there is no need to wait until this number has been reached by marking the reference marks. In this method, real and virtual reference marks can of course be combined: in the selected example described above, all corresponding factors will be multiplicatively included into the weight computation.

Further, the method can be suitably combined with optical SLAM methods known from robotics in that also the visual "features" measured by the optical sensors (see component (3) in FIGS. 4 and 6) will be included as contributing factors into the weight computation and/or as "importance sampling" step of the particle—e.g. as a multiplicative term in the weight. Further, each particle now also conveys the state of each observed visual feature and will adapt the location and spatial position as well as the precision thereof to the current observation and to the other states of the particle. Also, in the same manner, use can be made of features of ultrasonic or infrared or microwave sensor systems. These features can thus be understood and used as a part of the created map, and/or the extension described herein improves the creation of the map on the basis of the odometry.

The method can also be suitably combined with magnetic sensors in that the respective strength and direction of the local magnetic field are included as a feature and are incorporated in the system in correspondence to the above described visual features. In this case, the magnetic field will be measured with the aid of suitable electronic magnetic field sensors.

The method can also be advantageously improved by attaching odometric sensors on both feet (so that there exist two units of component (1)). Further, the use of several sensors on a foot can be provided in order to reduce the drift. By suitable combination of the sensor data (e.g. averaging of the odometry results or averaging the raw data of the sensors), an improved odometry can be achieved.

Further, the method can also be advantageously improved and/or simplified by arranging sensors for odometry (component (3) in FIGS. 4 and 6) on other parts of the body and using methods known from Pedestrian Dead Reckoning for computing and respectively improving the odometry (in component (4) in FIGS. 4 and 6). Further, it is possible to perform the method only with the aid of odometry by pedestrian step detection and estimation of the pedestrian step length/angle—without sensors attached to the shoe. (Thus, component (1) in FIGS. 4 and 6 is optional in this case.)

Further, the method can also be advantageously simplified in that, when using polygon or hexagon P-maps, the counters will be updated and stored only for an edge between two polygons or hexagons, and not individually for all edges of all hexagons. As a result, the required storage capacity can be noticeably reduced.

Further, the method can also be advantageously improved and/or simplified by application of the visual odometry known from robotics ("Lucas-Kanade" or "Focus of Expansion" methods). In such a case, with the aid of optical sensors (e.g. camera (component (1) in FIGS. 4 and 6)), the change of the appearance of the environment is used for estimating the change of the person's position and orientation.

Further, the method can also be advantageously improved, using the polygon representation (polygon P-maps), in that the polygon grid is adapted to the environment so as to be configured with varying density. The polygons can also overlap. Further, a plurality polygon levels can be used hierarchically and the transition counters for each level can be computed separately. Also in the weight computation of the particles, all levels will be included (e.g. multiplicatively in the weight).

As a card, there are then output all levels established in this manner.

Further, the method can also be advantageously realized in that, when using hexagon P-maps instead of a hexagon grid, other grid elements are used (e.g. rectangles, triangles, other polygons). These can be arranged with overlap or without overlap and/or be regular or irregular and/or be configured in a plurality of planes. In analogy with the realization by hexagons, the angle range transitions are counted and included in the weight computation.

Further, the method can also be advantageously realized in that, if using hexagon P-maps, use is made, instead of a hexagon grid or another polygon grid, of a regular or irregular arrangement of circles or ovals. In this case, no edge transitions are counted but there is detected the angle via which the circle is left during a pedestrian step or part of a pedestrian step. For this angle (in suitable random quantization, i.e. subdivision of ranges of values), the angle range transition counter is evaluated and updated (in analogy with the hexagons in the embodiment). In case of an overlapping pattern of circles, one would always select the circle whose center is closest to the particle. In analogy with the realization by hexagons, the edge transitions are counted and included in the weight computation.

Further, the method can also be advantageously realized in that there are evaluated not only the counters for edge transitions and respectively angle range transitions per hexagon or other structure but also those for each combination of any number of previous transitions. If Nm such previous transitions are considered, this is referred to as a Markov process of the Nm-th order, and one can use the methods for computation of the Markov process that are known in the field, such as e.g. the representation of the Markov chain as a so-called directional Bayesian network (which, for simplification, has to comprise only node transitions from each state node of the Markov chain, i.e. for example the edge transitions of the respective earlier hexagon in hexagon P-maps, to the node of the edge transitions of the current hexagon), and the learning acquisition of the Bayesian Network's likelihood tables in accordance with the known Baysian learning of data in a situation with a known network structure. Also in this case, the computation of the integral from FIG. 8 can be analytically solved beforehand and corresponds to the solving of a Bayesian network with a target node and Nm independent parent nodes.

Further, the method can also be advantageously improved in that, when creating the map, use is made of already created maps of other users. Thus, for instance, the "a-priori" counters can be set to already measured transition counters.

Further, the method can also be advantageously extended in that, when creating the map, the measured sensor values (inclusive of data of other sensors which possibly are to be used further on, such as e.g. satellite navigation, compass, etc.) of a plurality of walks in the same environment or in overlapping environments will be linked. These data sets can be picked up from the same walker or from different persons. Thus, it would be possible that knowledgeable persons—e.g. employees working in a building—will, for a time, pick up measurement data during a given normal working day or during special measurement walks. In the process or later on, these data can be transmitted to a computing unit (e.g. server), and this computing unit can generate a map from them. As an extension of the above, newly obtained maps and respectively measurements of certain areas can be linked with maps/measurements of (partially) overlapping areas which already exist or which have been included parallel thereto. This linking can be realized e.g. in the following different manners:

1. by connection of the individual maps, after each map for each walk has been created. In case of overlapping areas, the connection can be performed by detection of common geometric features in the maps, e.g. by means of cross correlation of the transition probabilities in the search space of different rotation, translation and scaling transformations of one of the maps. Herein, the maps will be combined under consideration of the transformation with the largest correlation (e.g. addition of the map counters). In this combination, it has to be considered that, when a rotation occurs, the edges of the hexagon (or other polygons) of the maps will have been rotated relative to each other. The angle does not have to be a multiple of the polygon base angle (e.g. 60° for the hexagon). In this case, when performing the compensation, an interpolation can be carried out between the adjacent contributing edge values. In scaling or translation, the process can be similar if, after these transformations, the hexagon grids do not fit onto each other—also here, the contributing edges can be combined with weighted averaging.

2. As described above—but after combining new maps with existing maps, the resultant map will be used as an "a-priori" counter for a renewed application of the SLAM algorithm to the individual sets of data. The individual edges resulting therefrom will then be combined again. This process can be iteratively repeated for all or individual ones of the contributing sets of data. In the use of the "a-priori" counters in the renewed computation of a map from a data set X, the method can be improved in that the counters from the map which had been flown from the data set X into the common map, will be withdrawn from this map, but only for the renewed processing of the data set X. This last-mentioned principle corresponds to the known consideration of "extrinsic" and "intrinsic" information in the iterative decoding of turbo codes which are used for error correction in news technology.

3. As described above, but with the extension feature that, when combining the counter values, there is not realized a simple addition of the values from the new and the existing map, but a random linear or non-linear function of the contributing values (e.g. weighted addition, compression of the contributing values, compression of the result of an addition, application of thresholds to the contributing values or to the result).

As described in the context of the combining of maps, the computed map can be subjected to a desired linear or non-linear function (e.g. compression of the counter values or probabilities, application of thresholds).

A further, still more detailed description of the invention is found in the articles listed hereunder, their subject matters being herewith included by reference in the present application:

Conference GNSS-ION: "Inertial Systems Based Joint Mapping and Positioning for Pedestrian Navigation", Patrick Robertson, Michael Angermann, Bernhard Krach, Mohammed Khider; Sep. 22-25 2009, Savannah, Ga., USA.

Conference UbiComp 2009: "Simultaneous Localization and Mapping for Pedestrians using only Foot-Mounted Inertial Sensors", Patrick Robertson, Michael Angermann, Bernhard Krach, Sep. 30-Oct. 3, 2009, Orlando, Fla., USA.

Robertson, Patrick; Angermann, Michael; Krach, Bernhard and Khider, Mohammed: SLAM Dance: Inertial-Based Joint Mapping and Positioning for Pedestrian Navigation, InsideGNSS, May 201 (www.insidegnss.com).

The invention claimed is:

1. A method for creating a map relating to location-related data on the likelihood of the future movement of a person in a spatial environment, said method comprising causing at least one person to carry one or more sensors for odometrical measurement (odometry), wherein the odometry is error-prone due to inherent measurement inaccuracies of the one or more sensors, causing the at least one person to move by foot through the spatial environment, determining from measurement signals of the one or more sensors information regarding the pedestrian step lengths and/or pedestrian step direction and/or orientation of the sensor or the person (called odometry information $Z^u$), creating a map based on said odometry information using a Bayesian estimator, wherein a state-variable space thereof comprises both the current pedestrian step (pedestrian step length and optionally movement direction change as well) of the person, odometry errors E and also the location-related data on the probabilities of the future movement of the person.

2. The method according to claim 1, wherein said map is created with a delay during the movement of the person through the environment or after storage of the sensor measurement signals or the detected odometry information.

3. The method according to claim 1, wherein the computations for creating the map are performed either on an end device carried by the person, or on a server.

4. The method according to claim 1, comprising the step of using the created map either for positioning or routing of the person or for improved positioning or routing of other persons.

5. The method according to claim 1, wherein, for improvement of the odometry information, use is made of measurement signals/data of one or more further sensors including one or more of satellite navigation, magnetic compass, WLAN, measurements for positioning, mobile phone position measurements, UWB measurements for positioning, and/or that use is made of partial regions of a map of the environment for restricting the state space of the Bayesian estimator.

6. The method according to claim 1, wherein use is made of real or virtual reference marks which can be perceived by the person and whose presence and optionally position are included as further parameters into the state space of the Bayesian estimator.

7. The method according to claim 1, wherein the method is combined with optical SLAM methods known from robotics by including, into the determining of the state space of the Bayesian estimator, the visual features measured by optical sensors.

8. The method according to claim 1, wherein use is made of magnetic sensors by including the respective strength and direction of the local magnetic field as a feature and entering them corresponding to a visual feature into the computations.

9. The method according to claim 1, wherein the person is provided with a plurality of sensors for reducing odometry errors, wherein an improved odometry can be achieved by combining the measurement signals of the plurality of sensors.

10. The method according to claim 1, wherein sensors for odometry can be placed on parts of the body other than the feet/shoes, and that methods known from Pedestrian Dead Reckoning are used for computation and respectively improvement of the odometry.

11. The method according to claim 1, wherein, as a representation of the likelihood density function of the Bayesian estimator, use is made of the following mathematical product: the conditioned likelihood density of the current odometry errors E, conditioned to the odometry errors in the last time-instant step, multiplied by the conditioned likelihood density of the current pedestrian step vector U, conditioned to the current odometry information $Z^u$ and the current drift parameter E.

12. The method according to claim 1, wherein, for a map relating to location-related data on the likelihood of the future movement of a person in a spatial environment, use is made of data on transition probabilities over edges of spatially arranged polygons, wherein, in case of realization by means of a particle filter, the edge transitions of the particle at each polygon transition for this particle are counted and included into a weight computation.

13. The method according to claim 12, wherein the counters are updated and stored only for one edge between two adjacent polygons and not individually for all edges of all polygons, whereby the required storage capacity can be distinctly reduced.

14. The method according to claim 1, wherein use is made of visual odometry methods known from robotics, wherein, with the aid of optical sensors, use is made of the change of the appearance of the environment for estimating the change of location and position of the person.

15. The method according to claim 1, wherein, with use of polygon representations, e.g. hexagon of the map, the polygon grid is adapted to the environment so as to be configured with varying density, wherein the polygons can overlap and/or a plurality of polygon planes can be used hierarchically and the transition counters are computed separately for each plane, and wherein, in the weight computation of the hypotheses of a particle filter, all planes are included.

16. The method according to claim 1, wherein, if polygons are used for the map, the polygons are configured with overlap or without overlap and/or are regular or irregular and/or are configured in a plurality of planes.

17. The method according to claim 1, wherein, if polygons are used for the map, use is made, instead of using a polygon grid, of a regular or irregular arrangement of circles or ovals or other geometric shapes, wherein, instead of counting an edge transition, there is detected the angle via which the shape is left during a pedestrian step or part of a pedestrian step, and an angle range transition counter is evaluated and updated for this angle, wherein, in case of an over-lapping pattern of shapes, there is always selected that shape whose center is closest to the particle, and, in analogy with the realization by hexagons, the angle range transitions are counted and included in the weight computation.

18. The method according to claim 1, wherein there are evaluated not only the counters for edge transitions and respectively angle range transitions per hexagon or other structure but also those for each combination of any number of previous transitions.

19. The method according to claim 1, wherein, when creating the map, use is made of already created maps of other users or other walks of a person, e.g. by placing the "a-priori" counters for edge transitions of polygon maps onto already measured transition counters and/or performing an iterative processing wherein the map creation for an odometry data set is continuously repeated with use of mutually created maps.

20. The method according to claim 1, wherein the created map represents three spatial dimensions.

* * * * *